Aug. 24, 1926.

H. C. LESLIE 1,597,414

BUMPER FOR WATER CLOSET SEATS

Filed Dec. 16, 1924

Inventor:
Howard C. Leslie,
by Walter E. Lombard.
Atty.

Patented Aug. 24, 1926.

1,597,414

UNITED STATES PATENT OFFICE.

HOWARD C. LESLIE, OF MILTON, MASSACHUSETTS.

BUMPER FOR WATER-CLOSET SEATS.

Application filed December 16, 1924. Serial No. 756,226.

This invention relates to cushion bumpers particularly designed for use on water closet seats and covers, and has for its object the production of a device of this character which may be applied readily to a seat or cover and when so applied will be free from all depressions liable to collect dirt and have no exposed metal parts liable to rust.

These objects are attained by the means illustrated in the accompanying drawing.

For the purpose of illustrating the invention, one preferred form thereof is illustrated in the drawings, this form having been found to give satisfactory and reliable results although it is to be understood that the various instrumentalities of which the invention consists can be variously arranged and organized and the invention is not limited to the precise arrangement and organization of these instrumentalities as herein shown and described except as required by the scope of the appended claim.

Of the drawings:—

Similar characters indicate like parts throughout the several figures of the drawings.

Figure 1:
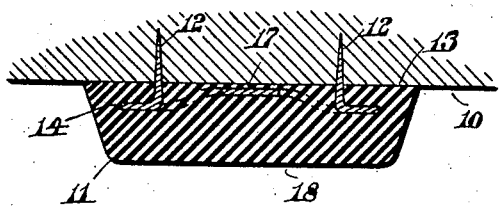
Figure 1 represents a section of a bumper embodying the principles of the present invention, said bumper being shown secured to a closet seat.
Figure 2:
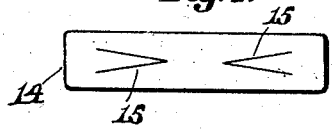
Figure 2 represents a plan of the metal bar used in the bumper.

In the drawings 10 is a portion of a seat or cover for water closets having secured thereto a bumper 11, which bumper is designed to reduce the impact upon the hopper or other member with which said seat or cover coacts.

It is essential for sanitary reasons that the bumper 11 should be free from all depressions which would be liable to collect dirt and it is quite as essential that the bumper should have no exposed metal parts which would be liable to rust.

It is obvious, therefore, that the securing members 12 should have the body portions thereof wholly embedded in the bumper 11 which is preferably molded of a resilient material such as rubber.

These bumpers are usually elongated and are secured to the seat 10 by two prongs 12 projecting from the base 13 of the bumper with one prong or securing member 12 near each end thereof.

In order to retain these securing members 12 properly spaced apart it is desirable to have a connection 14 between them which connection will be embedded in the bumper 11 while the latter is being molded.

Preferably the connection 14 between the two securing members 12 is formed integral with said members 12, as shown in Figs. 1 to 4 inclusive.

Figure 3:
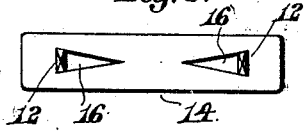
Figure 3 represents a plan of same with the securing prongs bent perpendicular to the body portion of the bar.
Figure 4:
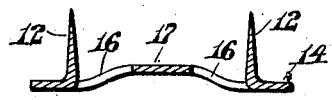
Figure 4 represents a vertical section of the same.

As shown in these figures the connection is in the form of a flat bar 14 having V-shaped slits 15 cut therein near each end, thereby forming tapered securing members 12 which may be bent perpendicular to the bar 14 as shown in Figs. 3 and 4, these members 12 being of sufficient length to extend beyond the base 13 of the bumper 11 and provide means whereby said bumper may be secured to the seat 10 by pressure applied to the outer face thereof.

Where the tapered members 12 are bent outwardly from the bar 14 holes 16 are formed in said bar through which the molded rubber of the bumper extends, thereby firmly uniting the portions of the bumper on opposite sides of the bar 14.

It is preferred to curve the bar 14 between the tapered securing members 12, as indicated at 17, thereby leaving a deep portion of rubber between the center of the bar 14 and the outer face 18 of the bumper, thereby providing for longer wear of the bumper.

The bar 14 is molded into the bumper near its base 13, thus leaving considerable thickness of rubber between the bar 14 and the outer face 18 of the bumper.

Owing to the bar 14 being flat the bumper is given considerable rigidity and when pressure is applied to the outer face 18 the securing members may be quickly forced into the material of the seat 10.

By forming bumpers in this manner all nail and screw holes are avoided which is a great advantage as these holes are liable to collect foreign substances therein and become unsanitary.

These bumpers as shown and described may be easily applied to the seats with very little labor and are very cheaply manufactured.

As the securing members 12 are made of metal they may be clinched in the seat when driven therein.

By providing the flat bar between the securing prongs the rubber of the bumper will not be cut through when pressure is applied thereto as has been found to be the case when wire has been used in the bumpers.

This bar 14, moreover, gives increased rigidity to the bumper both lengthwise and sidewise, without affecting its elasticity.

It is believed that the operation and many advantages of the invention will be apparent without further description.

Having thus described my invention I claim:—

A bumper for closet seats and the like comprising a flat bar having two sharp pointed and slightly tapering substantially parallel securing prongs struck up from the intermediate part of the bar and having their bases at opposite ends of said intermediate part, said intermediate part being bent towards a line connecting the sharp ends of said prongs, and an elongated body of rubber or the like in which all parts of said bar and the bases of said prongs are embedded in such relation that the sharp pointed parts of the prongs extend from one side of said body, substantially as shown, for the purpose specified.

Signed by me at Boston, Mass., this 11th day of December, 1924.

HOWARD C. LESLIE.